United States Patent
Innocenzi

(10) Patent No.: US 10,518,121 B2
(45) Date of Patent: Dec. 31, 2019

(54) REVERSIBLY INSTALLABLE MODULAR FITNESS AREA

(71) Applicant: METALCO ACTIVE S.R.L., Castelminio di Resana (TV) (IT)

(72) Inventor: Gian Luca Innocenzi, Castelminio di Resana (IT)

(73) Assignee: METALCO ACTIVE S.R.L., Castelminio di Resana (IT)

(*) Notice: Subject to any disclaimer, the term of this patent is extended or adjusted under 35 U.S.C. 154(b) by 52 days.

(21) Appl. No.: 15/775,927

(22) PCT Filed: Nov. 14, 2016

(86) PCT No.: PCT/IB2016/056837
§ 371 (c)(1),
(2) Date: May 14, 2018

(87) PCT Pub. No.: WO2017/085610
PCT Pub. Date: May 26, 2017

(65) Prior Publication Data
US 2018/0326239 A1 Nov. 15, 2018

(30) Foreign Application Priority Data
Nov. 16, 2015 (IT) .......................... 102015000072966

(51) Int. Cl.
*A63B 17/04* (2006.01)
*A63C 19/02* (2006.01)
(Continued)

(52) U.S. Cl.
CPC ................ *A63B 17/04* (2013.01); *A63B 1/04* (2013.01); *A63B 3/00* (2013.01); *A63B 5/20* (2013.01);
(Continued)

(58) Field of Classification Search
None
See application file for complete search history.

(56) References Cited

U.S. PATENT DOCUMENTS 5,662,525 A * 9/1997 Briggs ..................... A63B 9/00
472/128
6,283,871 B1 * 9/2001 Briggs ..................... A63B 9/00
472/136
(Continued)

FOREIGN PATENT DOCUMENTS

WO   WO 2006/026255   3/2006
WO   WO 2012/000004   1/2012

OTHER PUBLICATIONS

International Search Report, PCT/IB2016/056837, dated Feb. 20, 2017.

*Primary Examiner* — Stephen R Crow
(74) *Attorney, Agent, or Firm* — Young & Thompson

(57) ABSTRACT

Disclosed is a reversibly installable modular fitness area including a plurality of platform-like islands adapted to support a plurality of systems and equipment in order to allow the user to carry out fitness exercises, the modular fitness area including at least one first central island; at least one second island; at least one third island; at least one fourth island; at least one fifth island; at least one sixth island; at least one seventh island; at least one eighth island; at least one ninth island; the modular fitness area also including an energy supply system adapted to supply power to the electronic components included therein.

20 Claims, 13 Drawing Sheets

(51) Int. Cl.
*A63B 71/06* (2006.01)
*A63B 1/04* (2006.01)
*A63B 3/00* (2006.01)
*A63B 26/00* (2006.01)
*H02S 20/30* (2014.01)
*A63B 5/20* (2006.01)
*A63B 6/00* (2006.01)
*A63B 9/00* (2006.01)
*A63B 21/055* (2006.01)
*A63B 24/00* (2006.01)
*B08B 3/02* (2006.01)
*H02S 99/00* (2014.01)
*H04N 7/18* (2006.01)
*A63C 19/04* (2006.01)

(52) U.S. Cl.
CPC .................. *A63B 6/00* (2013.01); *A63B 9/00* (2013.01); *A63B 21/0552* (2013.01); *A63B 24/0087* (2013.01); *A63B 26/003* (2013.01); *A63B 71/0622* (2013.01); *A63C 19/02* (2013.01); *B08B 3/02* (2013.01); *H02S 20/30* (2014.12); *H02S 99/00* (2013.01); *H04N 7/181* (2013.01); *A63B 2009/008* (2013.01); *A63B 2071/065* (2013.01); *A63B 2210/50* (2013.01); *A63B 2220/806* (2013.01); *A63B 2220/833* (2013.01); *A63B 2225/09* (2013.01); *A63B 2225/105* (2013.01); *A63B 2225/30* (2013.01); *A63B 2225/50* (2013.01); *A63B 2225/66* (2013.01); *A63C 19/04* (2013.01)

(56) References Cited

U.S. PATENT DOCUMENTS

| | | | |
|---|---|---|---|
| 7,060,002 B1 | 6/2006 | Boehme | |
| 8,038,589 B2* | 10/2011 | Sperry | A63B 17/00 482/148 |
| 9,206,581 B2* | 12/2015 | Mollick | E02D 27/32 |
| 9,300,170 B2* | 3/2016 | Omar | H02J 3/383 |
| 2005/0138867 A1* | 6/2005 | Zhao | E04H 1/04 52/79.1 |
| 2009/0007959 A1 | 1/2009 | Wu | |
| 2009/0186745 A1 | 7/2009 | Lewiston | |
| 2012/0071252 A1* | 3/2012 | Georg | A63G 21/02 472/92 |
| 2014/0014604 A1 | 1/2014 | De Moraes | |
| 2018/0093195 A1* | 4/2018 | Norquist | A63B 9/00 |

* cited by examiner

REVERSIBLY INSTALLABLE MODULAR FITNESS AREA

FIELD OF THE ART

The present invention refers to the urban building field. More in detail, the present invention regards a new and innovative type of modular fitness area to be preferably installed in public places.

STATE OF THE ART

It is now widely recognized that carrying out physical sports activities is beneficial and not only for aesthetic reasons. Fitness indeed represents an actual condition of the organism which can be considered preventive against many diseases, and in any case such to make a person healthy—substantially, both for physical and mental wellbeing of the individual.

Regular and assiduous conduction of physical sports activities leads to benefits such as: improvement of lymphatic circulation, strengthening of the locomotor apparatus and also of the immune system. Therefore, fitness also represents a preventive instrument for preventing the onset of diseases. Knowing that a state of physical and mental wellbeing can be reached due to the conduction of physical sports activities has made people increasingly motivated and inclined for physical training, whose benefits are even more evident if accompanied by a basically healthy lifestyle.

Therefore, for many years there has been the increasing need to set up places and structures equipped for carrying out many different sports activities.

Gyms/fitness areas undoubtedly represent the places where par excellence both individual and team sports are practiced; in addition, these structures for many represent the best choice, even only for the fact that they can be frequented at times that are not pre-established and usually incompatible with a person's common daily activities. Gyms/fitness areas are in fact open for use on days and at times that are decidedly more flexible than those set by competitive sports or specific courses. Nevertheless, even if the possibility to use equipped structures is appreciated—where personalized programs can be followed in a wide interval of hours that are not overlapped with other activities—there are in any case factors that represent an actual deterrent for frequenting fitness areas. In primis the economic aspect must be considered: the access to these places, the use of equipment as well as the possibility to follow the indications of a personal trainer understandably have costs that are not always accessible to the user. Another aspect regards their location: even if most inhabited centers, from small towns to big cities, generally have a plurality of gyms/fitness areas, reaching these structures is sometimes difficult especially when it is necessary to take public transportation that is not always reliable in terms of schedule, or use the car and search for a parking place in order to park it, which certainly represents a source of stress as well as a loss of time. A further factor that could be considered as inhibiting the user lies in the structure of the gyms/fitness areas themselves. These structures are in fact represented, in most cases, by closed places that—even if suitably climate-conditioned—they are still places where the air could be perceived as not very healthy due to the relative crowding of people carrying out the physical sports activity in a relatively small or in any case closed place. It is also to be considered that during the warmest periods of the year, which moreover often coincide with those when most carry out physical sports activities, the imposition of having to train in closed places in order to be able to use specific equipment as well as have professional assistance sometimes make the activity of exercise training annoying and unpleasant for many people—making outdoor training increasingly desirable. Presently, parks, gardens and the like are of course known where it is possible to find fixed equipment available to the user for fitness activities. Nevertheless, this equipment are actually decidedly different and simplistic if compared with that found in gyms/fitness areas. In addition, with respect to the latter, said public structures do not offer the user the right assistance for executing the exercises in the correct manner. It is in fact known that physical training brings benefits to the organism when the physical exercises are completed in a correct manner; otherwise, there could even be physical damage to the organism. For such purpose, the object of the present industrial invention patent application, described in detail hereinbelow, is to propose a modular fitness area comprising a plurality of specific components for carrying out particular exercises whose mode of actuation is illustrated to the user by means of a suitable mobile application or directly on displays comprised in the fitness area itself. More in detail, the object of the present invention is to provide the user with a modular fitness area that can be enjoyed outdoors (or indoors) at relatively low costs, if not free, which is comparable to the most advanced indoor fitness areas. Such condition is obtainable due to the synergistic results deriving from the cooperation of the components present in said fitness area; such results are encountered due to the coexistence of several components present in said fitness area. On such matter, it should be indicated that the single components comprised in the present fitness area, even if representing systems or expedients known for the relative functions carried out, are such to give rise when cooperating—to a self-consistent structure whose benefits are comparable to those of common indoor fitness areas equipped with technologically advanced systems and equipment.

DESCRIPTION OF THE INVENTION

The present description refers to a new and innovative modular fitness area reversibly installable in any place, preferably in outdoor public places. More in detail, the present description refers to a particular fitness area comprising a plurality of modules, each adapted to support specific components such to allow carrying out specific fitness exercises, whose correct mode of actuation is shown to the user by means of a suitable mobile application that can be downloaded on a common smartphone or similar devices or on displays with which the fitness area is equipped in some embodiments.

Still more in detail, the present fitness area comprises a plurality of platforms, indicated herein as "islands", each supporting one or more components for physical training. Among these islands, one is to be arranged on the ground centrally with respect to the others. Said central island is adapted to support a structure indicated herein as a tree-like "central tree" comprising a plurality of branches. Such central tree with its branches is adapted to offer valid extensions useful for carrying out specific exercises, from which other components depart for physical training. The present fitness area is characterized for multiple aspects that will be better specified in the following description of the preferred embodiments. Among these, particular importance is assumed by the particular energy supply system which makes use of photovoltaic modules shaped as leaves. The use of photovoltaic modules has been well-known for years and is widespread for many different applications; it is proposed herein in order to contribute to the activation of the aforesaid synergistic effect. The installation of photovoltaic leaves in the present fitness areas is in fact such to allow a sufficient energy storage to drive the operation of other simultaneously useful systems, and necessary for making the overall structure quite functional and effective for the pre-established objects. All this also contributes to not altering the aesthetic characteristics of the structure—which do not have merely ornamental function but rather also serve for not altering the natural characteristics of the setting or at least rendering the overall structure settable in open places like parks, gardens and the like. The systems which the photovoltaic component allows power supplying are nebulized water dispensers, sanitizing systems, image display systems displays and video-surveillance systems. In addition to the aforesaid power supply system, the characteristic tree-like profile of the structure supported by the central island has particular importance, and the islands as such, since they have shown to be valid supports for offering the user various types of components, and specifically for offering particular systems that can be found in the most advanced indoor fitness areas for physical training. All this while occupying a relatively small surface extension. The modules of the present fitness area, hence the islands supporting the fitness systems, and the central tree, offer the user the possibility to render the physical training the holistic result deriving from the benefits that each exercise brings to the user, above all if executed in sequence with other exercises that can be carried out with the present fitness area.

Advantageously the latter is therefore a complete fitness area in every respect.

Advantageously, since said fitness area is typically, but not necessarily or exclusively to be installed in public places, the user can use it at practically zero cost, unlike that provided for frequenting common indoor fitness areas/gyms.

Advantageously, since the profile of the islands comprised therein is definable by any closed curve or polygonal form which subtends a surface extension sufficient for supporting the component(s) for the training in relation to the size thereof, it is possible to optimize the overall size that can be occupied by the fitness area.

Advantageously, since the component supported by the central island is represented by a tree-like structure, the islands of the structures being shaped as platforms which do not project excessively upward from the ground, and the present fitness area to be installed preferably in public places such as villas, parks, gardens and the like, a structure results therefrom that harmonizes with the surrounding environment without altering the natural scenery of the site.

Advantageously, since the modular fitness area is provided with a particular power supply system that exploits the photovoltaic effect, a structure results therefrom that is capable storing an energy quantity sufficient for power supplying other systems usable by the user.

Advantageously, since the aforesaid power supply system is represented by photovoltaic modules shaped as movable leaves which can be oriented and retracted in corresponding grooved housings present in the body of the branches of the central tree, a structure results therefrom with an efficient power supply system that only intervenes when necessary and which has characteristics such that it is not subject to damage of possible inclement weather.

As already mentioned, the use of the fitness area, object of the present invention, is accompanied by the use of a suitable mobile application downloadable on smartphone devices and the like. Even if the characteristics of said application are not expressly described and claimed in the present document, it should be indicated that these allow the user to observe, due to a suitable video, the way to correctly carry out the exercise so as to be able to correctly execute it, just as occurs in the indoor fitness areas/gyms where the instructors indicate how to carry out a specific physical exercise to various people.

DESCRIPTION OF THE PREFERRED EMBODIMENTS

Figure 1:
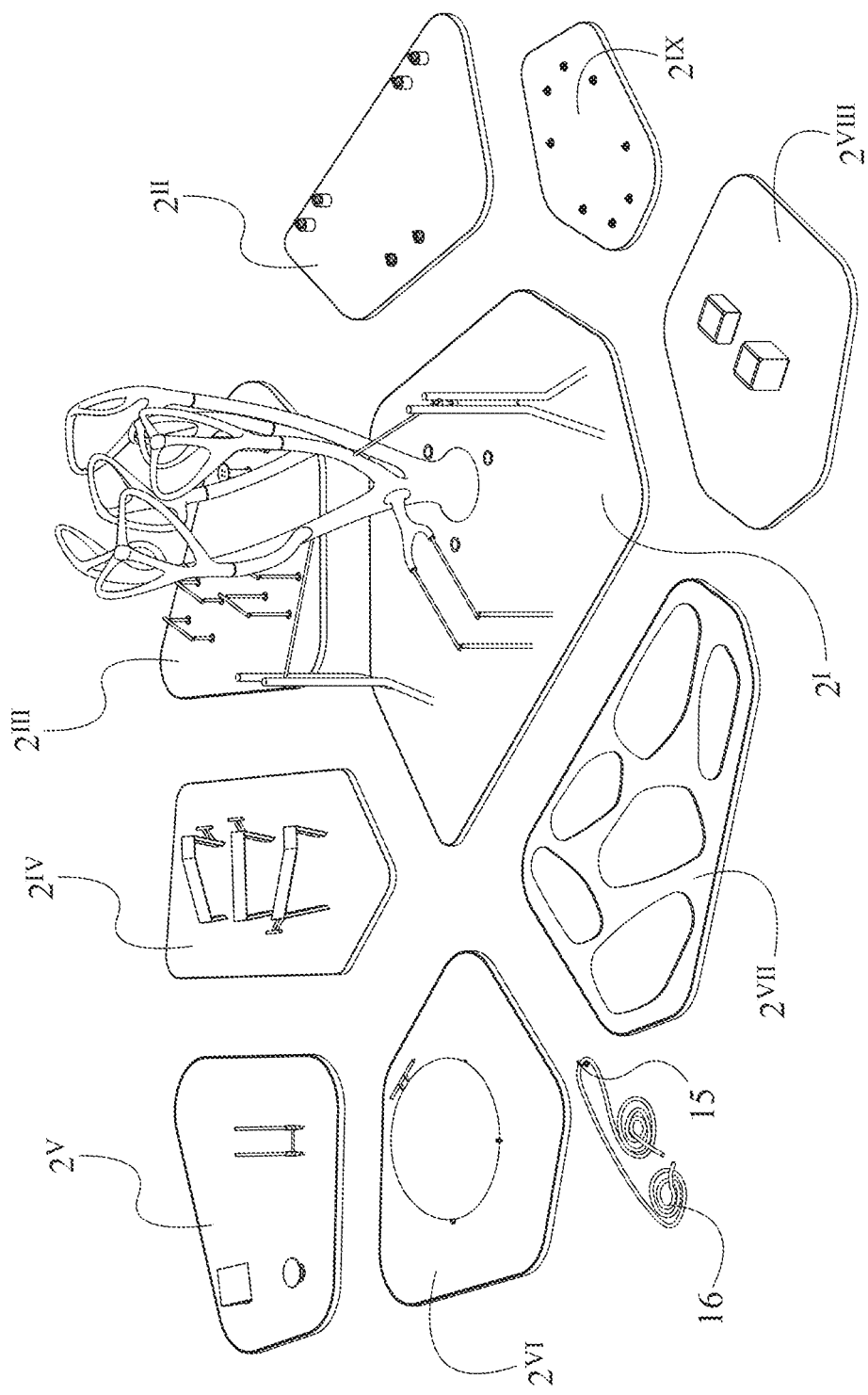
FIG. 1 shows a perspective view of the modular fitness area, object of the present industrial invention patent application. More in detail, the figure in question shows that said modular fitness area 1 comprises a plurality of islands 2, each having a profile defined by any closed curve or polygonal form, adapted to support a plurality of equipment and systems for carrying out fitness exercises. More in detail, as shown in the figure, said fitness area 1 comprises: a first island $2^I$, a second island $2^{II}$, a third island $2^{III}$, a fourth island $2^{IV}$, a fifth island $2^V$, a sixth island $2^{VI}$, a seventh island $2^{VII}$, an eighth island $2^{VIII}$, a ninth island $2^{IX}$ and a coupling element 15 to directly connect to the ground and adapted to allow the reversible fixing of a common fitness area rope such as a jump rope 16. The present fitness area is in primis characterized by the particular profile of the structure shaped as a central tree 3 supported by said first island $2^I$ and by the profile of all the other islands 2 which, being definable by any closed curve or polygonal form, allows optimizing the occupiable space and making an overall structure, hence a fitness area 1, which harmonizes with the surrounding environment without altering the natural characteristics thereof. All this while offering the user the possibility to carry out specific fitness exercises due to the plurality and variability of systems and equipment comprised therein.
Figure 2:
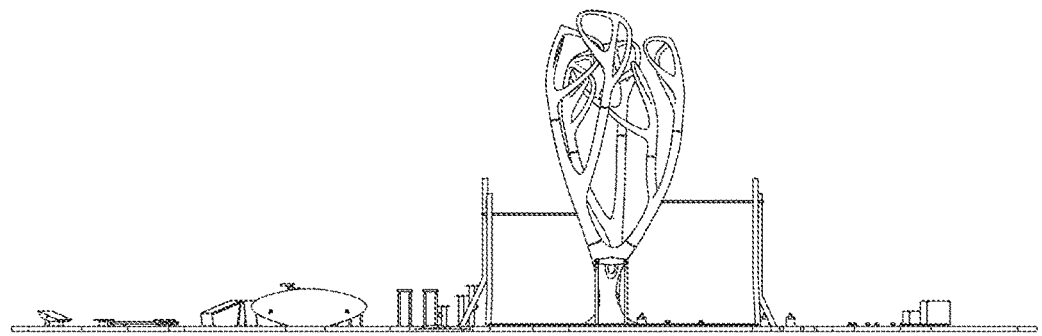
FIG. 2 is similar to the preceding FIG. 1 but shows a front view of the present modular fitness area 1.
Figure 3:
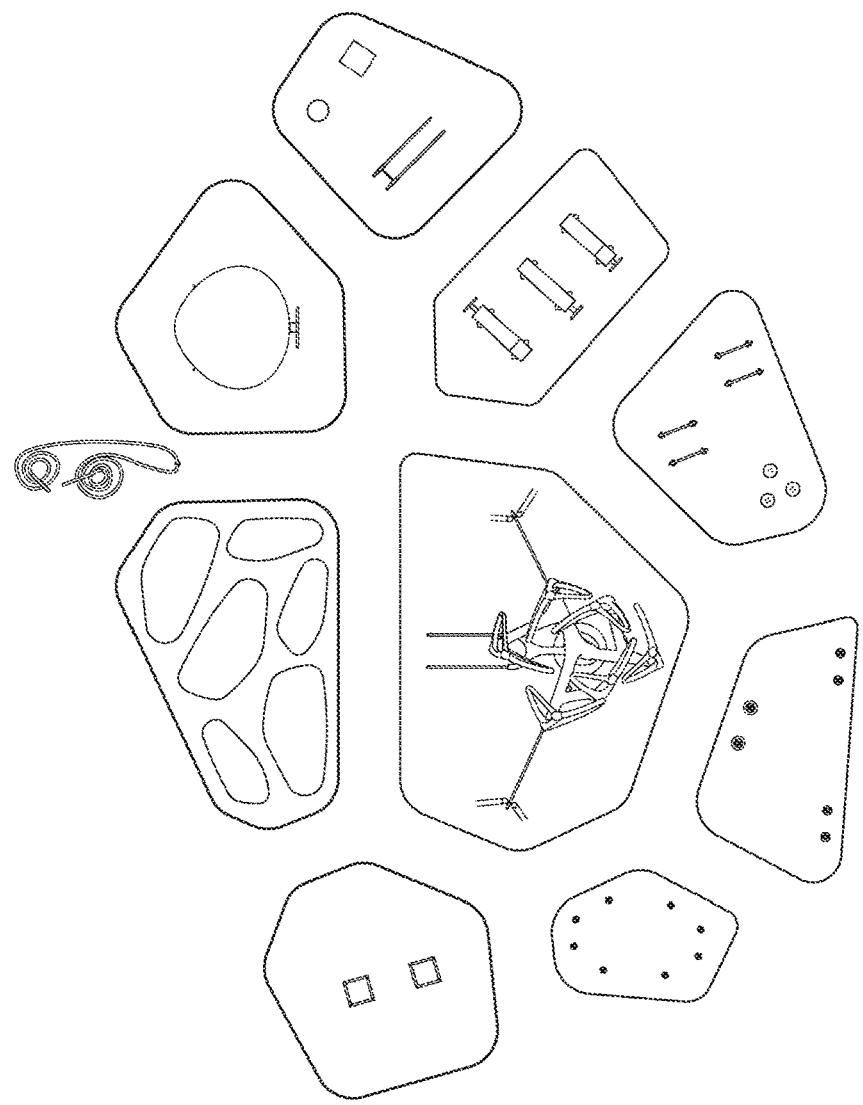
FIG. 3 shows a plan view of the modular fitness area 1 and of the islands 2 comprised therein.
Figure 4:
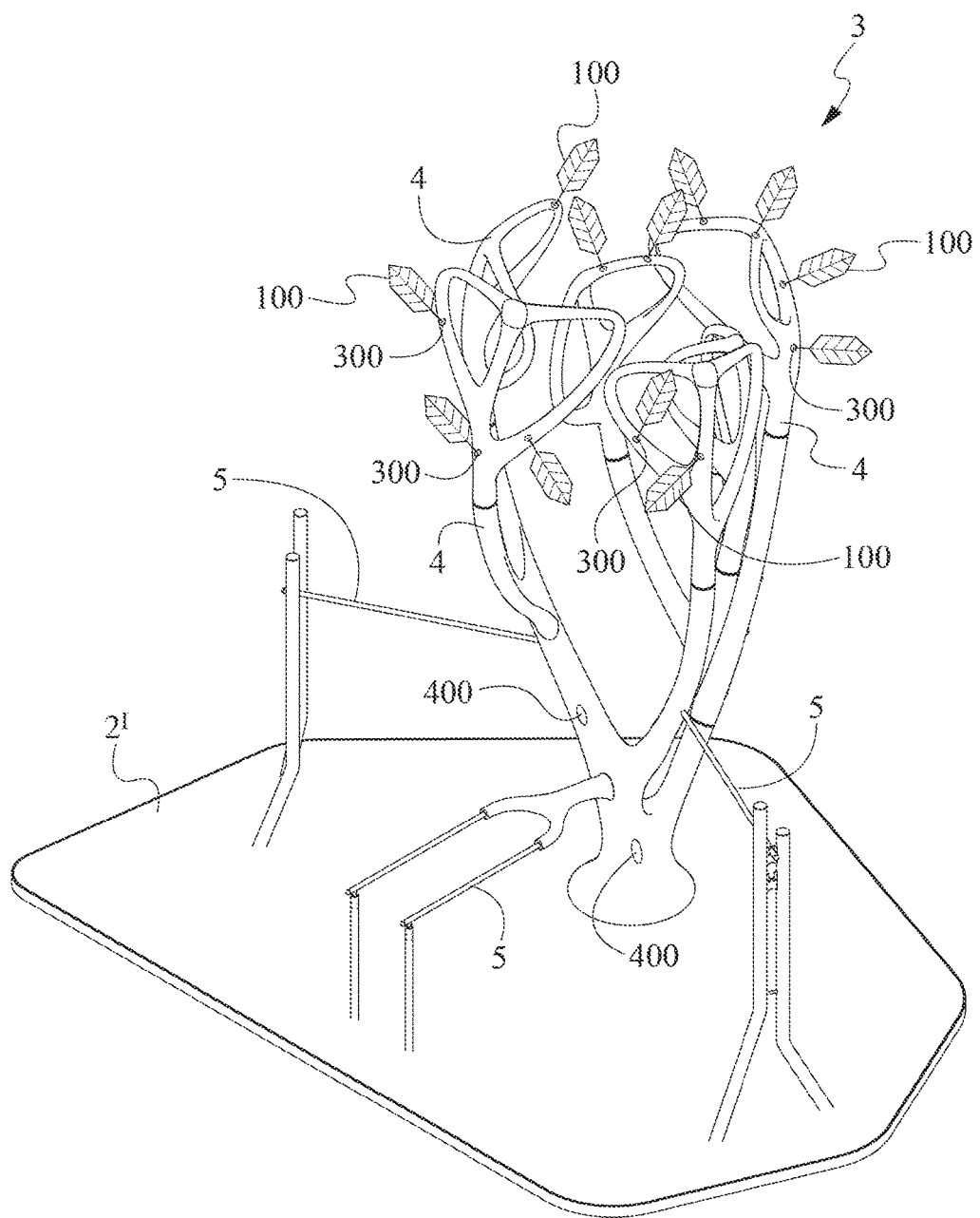
FIG. 4 shows a detailed perspective view of the first island $2^I$ of the modular fitness area 1. As observed by the figures, said second island $2^I$ supports a modular central tree 3, comprising a plurality of branches 4 having profile defined by any closed curve or polygonal form and/or open curve and/or polygonal chain, from which bars 5 depart for traction, such as common bars that can be found in indoor fitness areas/gyms for carrying out traction exercises. The figure also shows that, on the branches 4 of the central tree 3, an energy supply system is presented represented by a plurality of photovoltaic modules shaped as movable leaves 100. Such movable leaves 100 are connected to the body of the branches 4 by means of common ball joints 300, which if requested allow varying the orientation of the movable leaves 100. The movable leaves 100, in addition to present various degrees of rotational movement freedom, have two main configurations: one, in which said leaves are extended, independent of their separate orientation, outside the branches, and another in which said leaves are retracted within the branches 4. The figure in question also shows that on the trunk of the central tree 3, nozzles 400 are present that are adapted to delivery water in nebulized form for the cooling of users during the course of the exercises.
Figure 5:
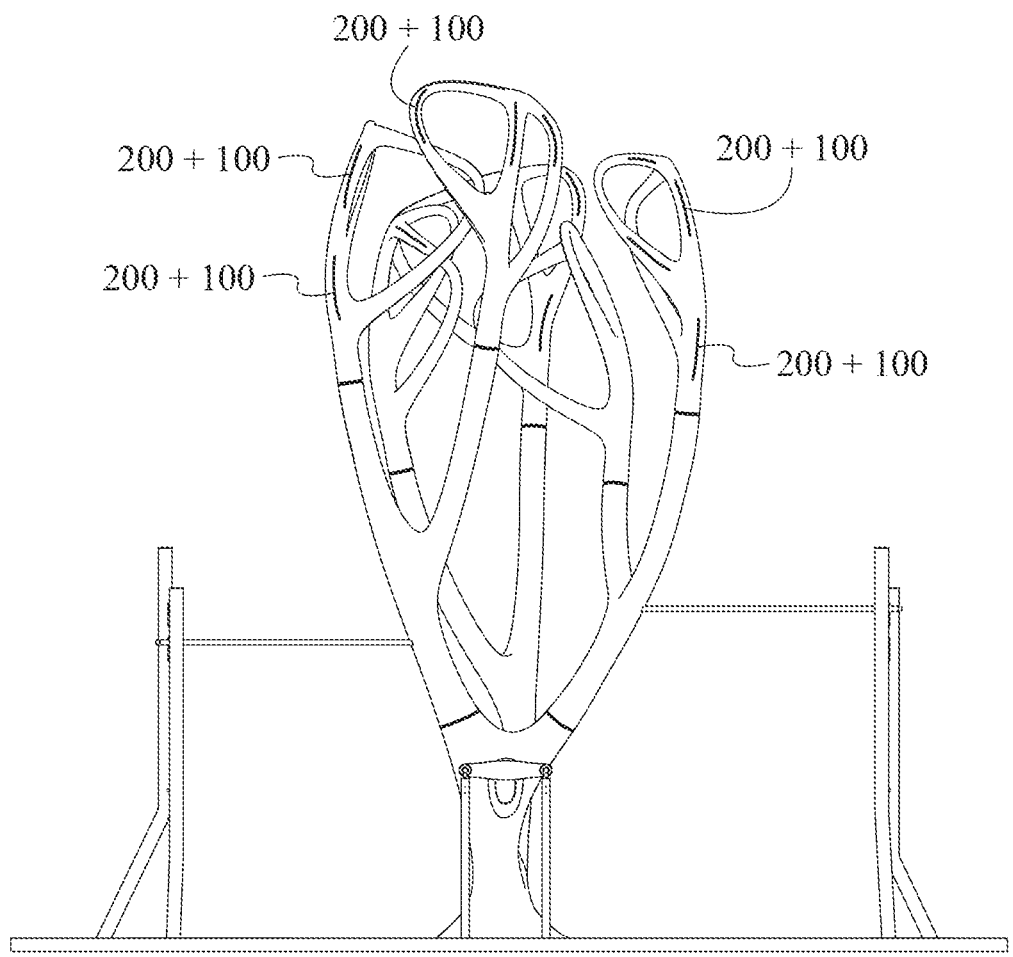
FIG. 5 is similar to the preceding FIG. 3 but shows a front view of the tree 3 supported by the first island $2^I$. The figure also shows the case in which the movable leaves 4 are retracted within corresponding groove housings 200 made in the body of the branches 4.
Figure 6:
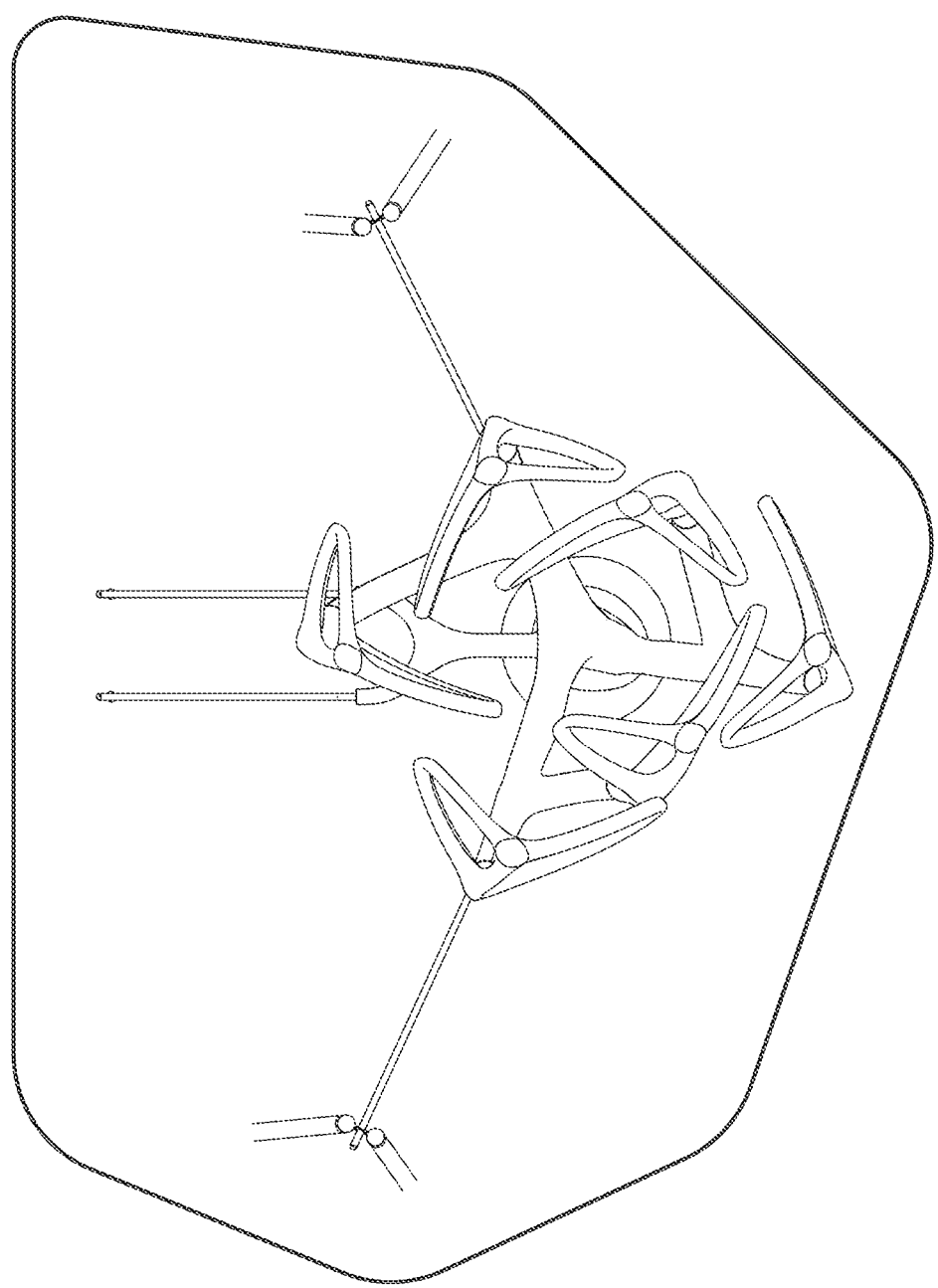
FIG. 6 instead shows a plan view of the first island $2^I$ and of the tree 3.
Figure 7:
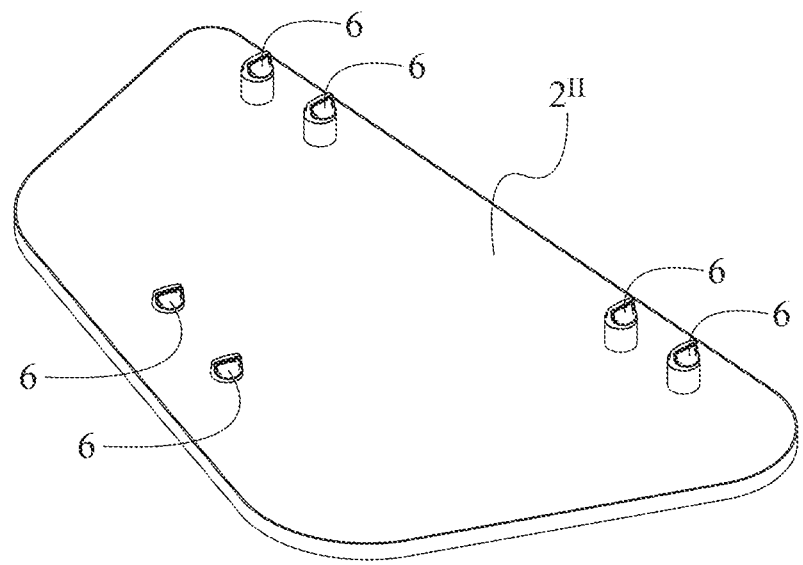
FIG. 7 shows a detailed perspective view of the second island $2^{II}$. More in detail, the figure in question shows that on said island $2^{II}$, a plurality of handle-shaped systems 6 can be found that are adapted to allow the user to carry out exercises such as, by way of example, push-ups.
Figure 8:
FIG. 8 shows a front view of the second island $2^{II}$.
Figure 9:
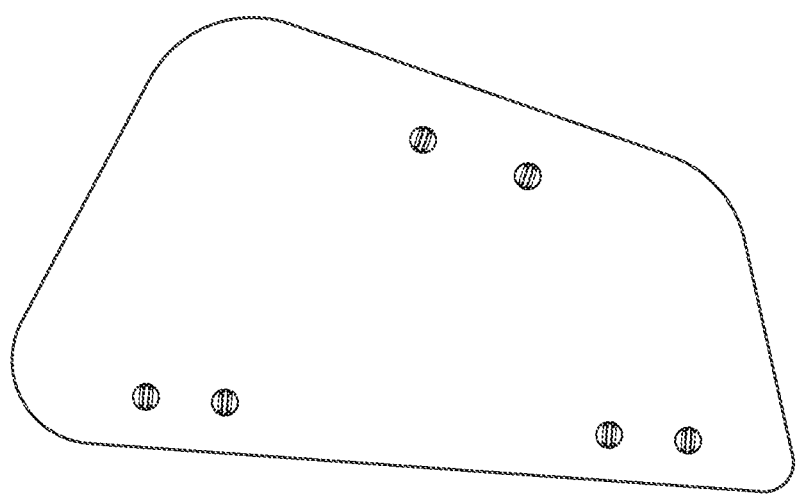
FIG. 9 instead shows a plan view of the second island $2^{II}$.
Figure 10:
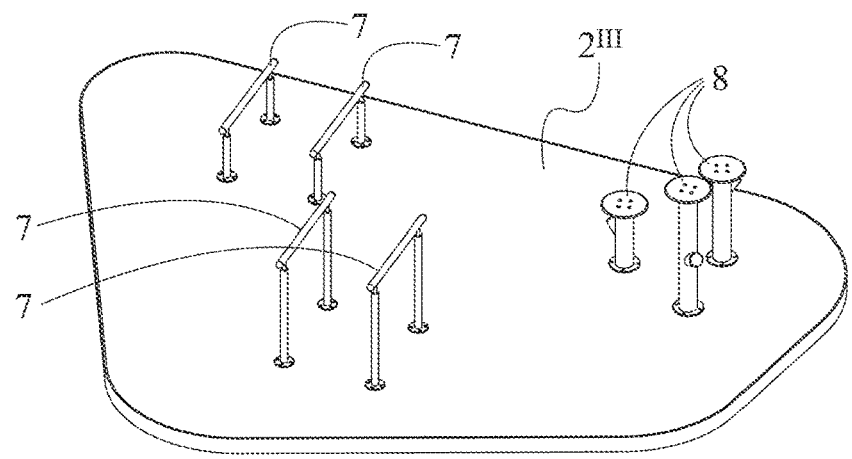
FIG. 10 shows a detailed perspective view of the third island $2^{III}$. More in detail the figure in question shows that said third island comprises a plurality of bars for agility exercises 7 and one or more elevations 8 for step exercises.
Figure 11:
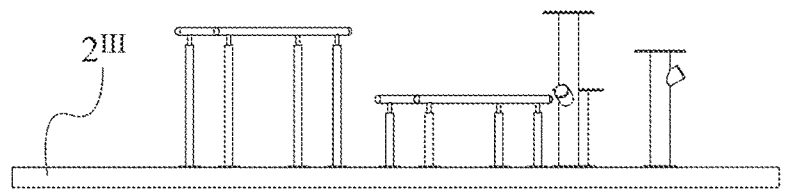
FIG. 11 shows a front view of the third island $2^{III}$.
Figure 12:
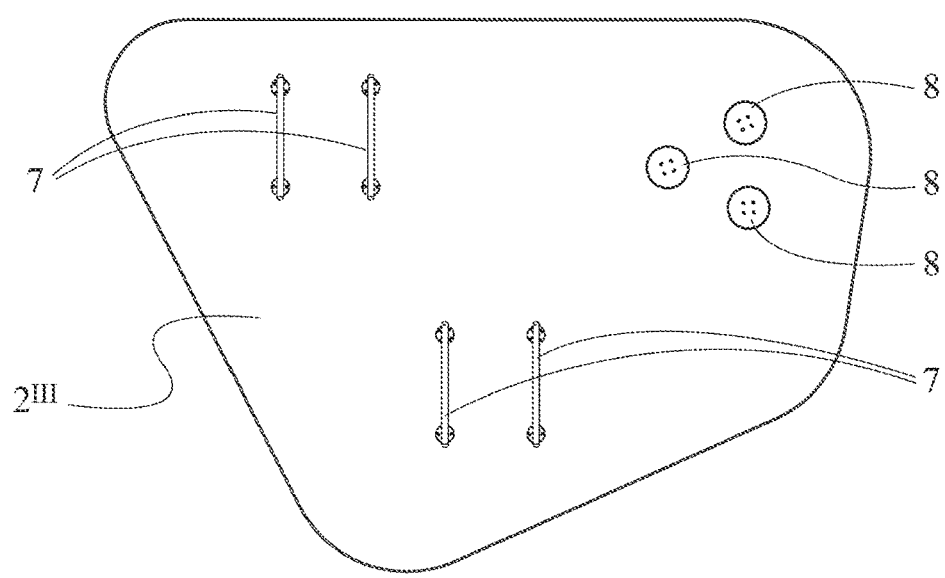
FIG. 12 shows a plan view of the third island $2^{III}$.
Figure 13:
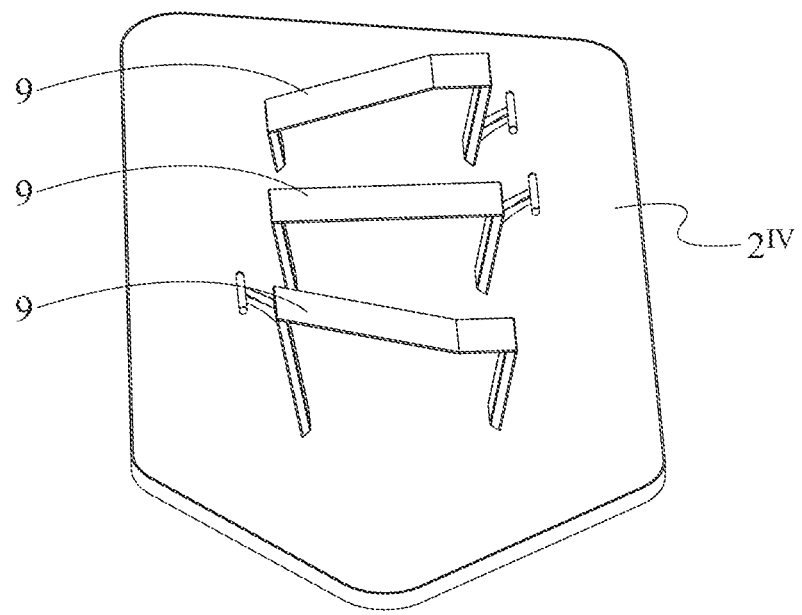
FIG. 13 shows a perspective view of the fourth island $2^{IV}$ of the modular fitness area 1 according to the present invention. More in detail, the figure in question shows that said island $2^{IV}$ is adapted to support a plurality of benches 9, tilted or parallel to the ground, adapted to allow exercises such as, by way of example, sit-ups.
Figure 14:
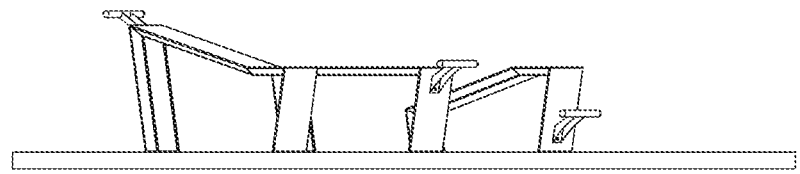
FIG. 14 shows a front view of the fourth island $2^{IV}$.
Figure 15:
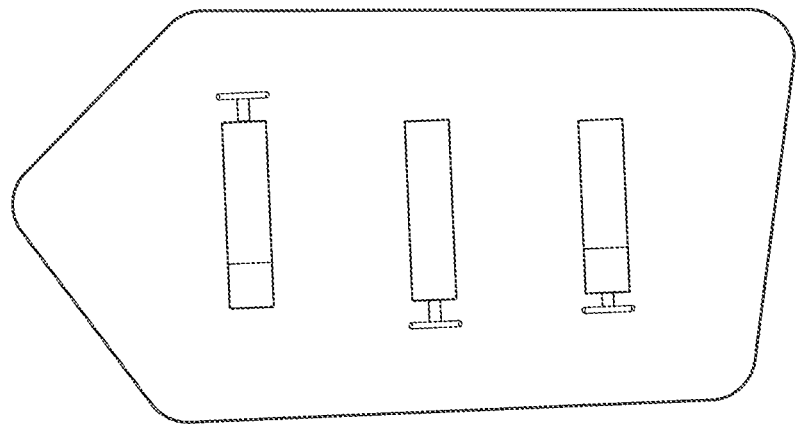
FIG. 15 shows a plan view of the fourth island $2^{IV}$.
Figure 16:
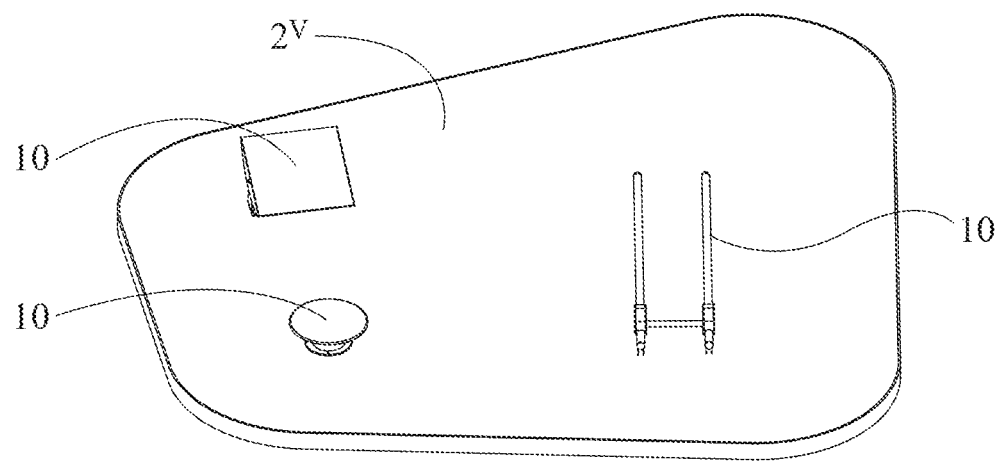
FIG. 16 shows a detailed perspective view of the fifth island $2^V$ of the present modular fitness area 1. More in detail, the figure in question shows that said island $2^V$ comcomprises a plurality of systems 10 such as, by way of example, oscillating platforms, for carrying out exercises for body balance.
Figure 17:
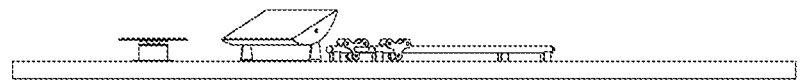
FIG. 17 shows a front view of the fifth island $2^V$.
Figure 18:
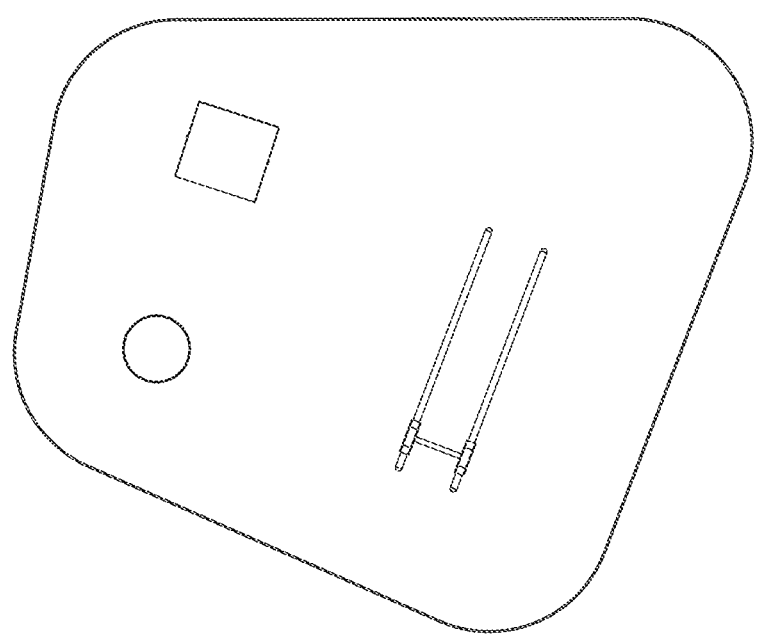
FIG. 18 shows a plant view of the fifth island $2^V$.
Figure 19:
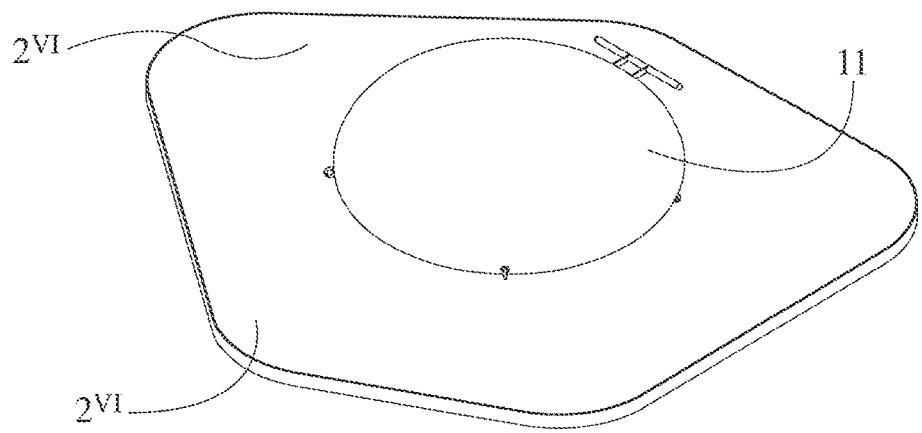
FIG. 19 shows a detailed perspective view of the sixth island $2^{VI}$ of the modular fitness area 1. More in detail the figure in question shows that said sixth island supports a structure 11 shaped as a smoothed erratic boulder with size such to receive a person, even in extended configuration, for carrying out body balance exercises.
Figure 20:
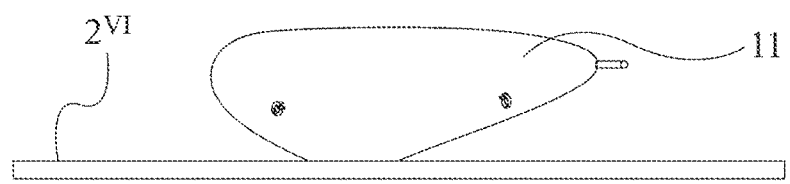
FIG. 20 shows a front view of the sixth island $2^{VI}$.
Figure 21:
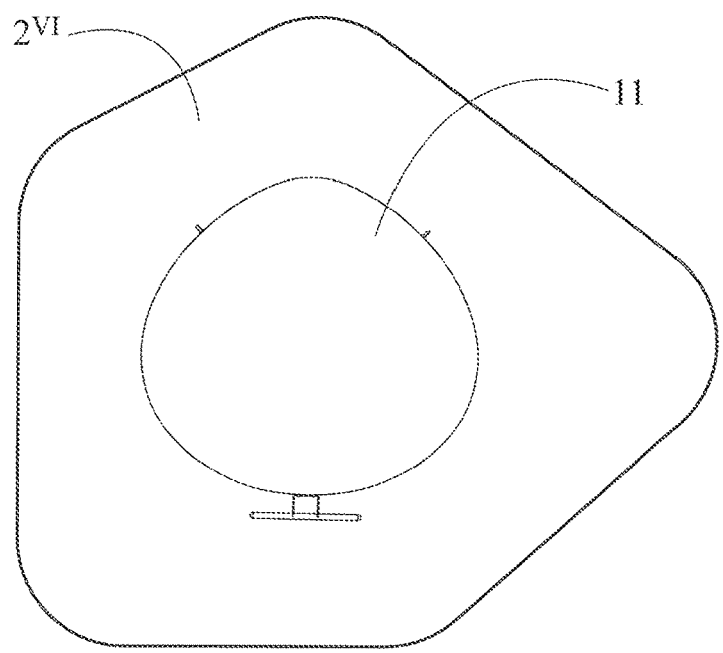
FIG. 21 shows a plant view of the sixth island $2^{VI}$.
Figure 22:
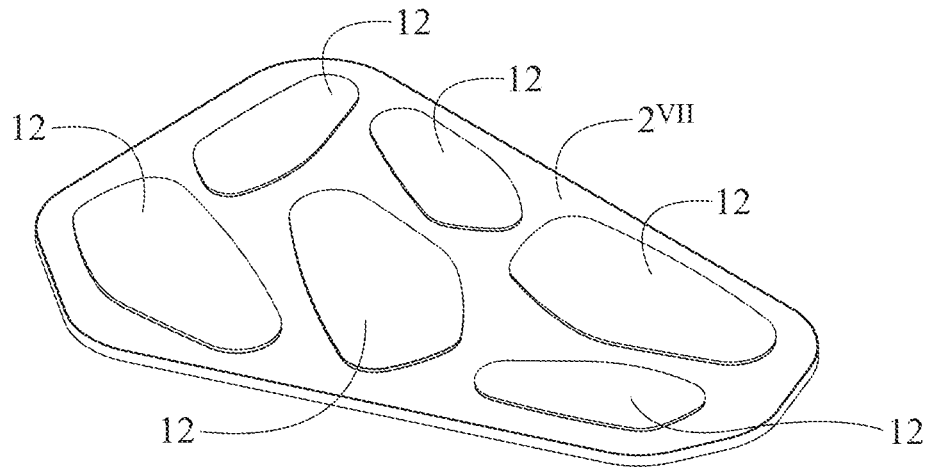
FIG. 22 shows a detailed perspective view of the seventh island $2^{VII}$ of the modular fitness area 1. More in detail, the figure in question shows that said seventh island $2^{VII}$ is adapted to support a plurality of rubberized mats 12, having profile definable by any closed curve or polygonal form, adapted to allow the user to carry out various "on the ground" fitness exercises.
Figure 23:
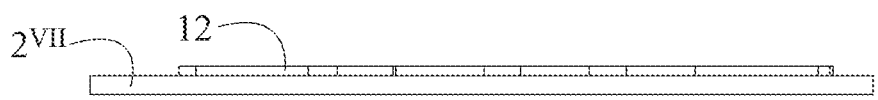
FIG. 23 shows a front view of said seventh island $2^{VII}$.
Figure 24:
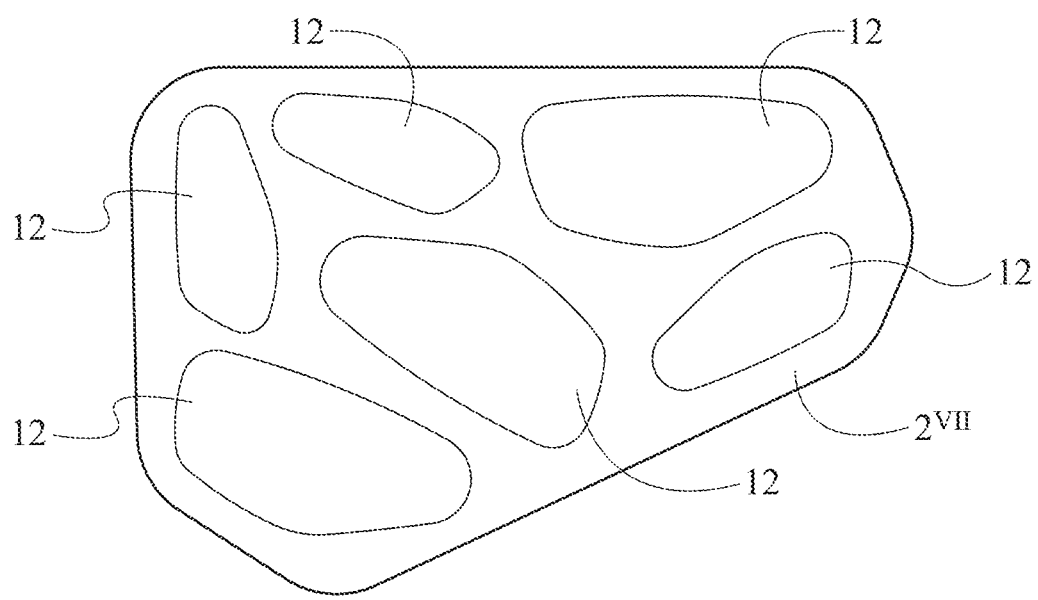
FIG. 24 shows a plan view of said seventh island $2^{VII}$.
Figure 25:
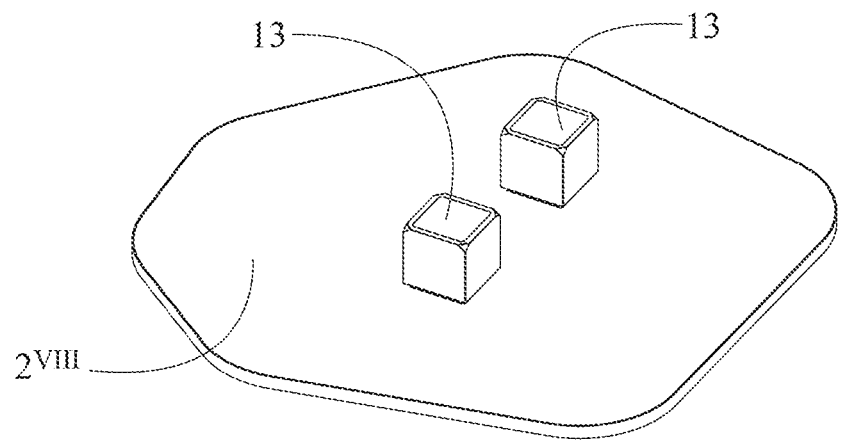
FIG. 25 shows a perspective view of the eighth island $2^{VIII}$ of the modular fitness area 1 according to the present invention. More in detail, the figure in question shows that said eighth island $2^{VIII}$ is adapted to support at least one, preferably at least two cube-like structures 13, also adapted for carrying out fitness exercises.
Figure 26:
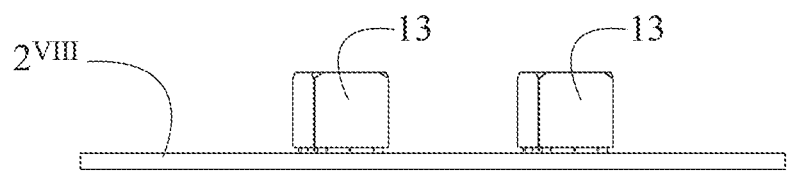
FIG. 26 shows a front view of the eighth island $2^{VIII}$.
Figure 27:
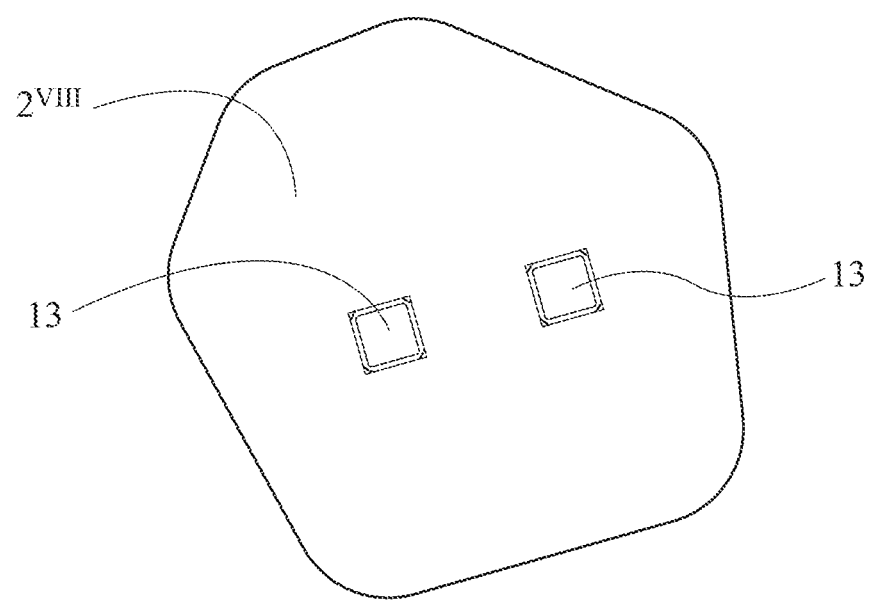
FIG. 27 shows a plan view of the eighth island $2^{VIII}$.
Figure 28:
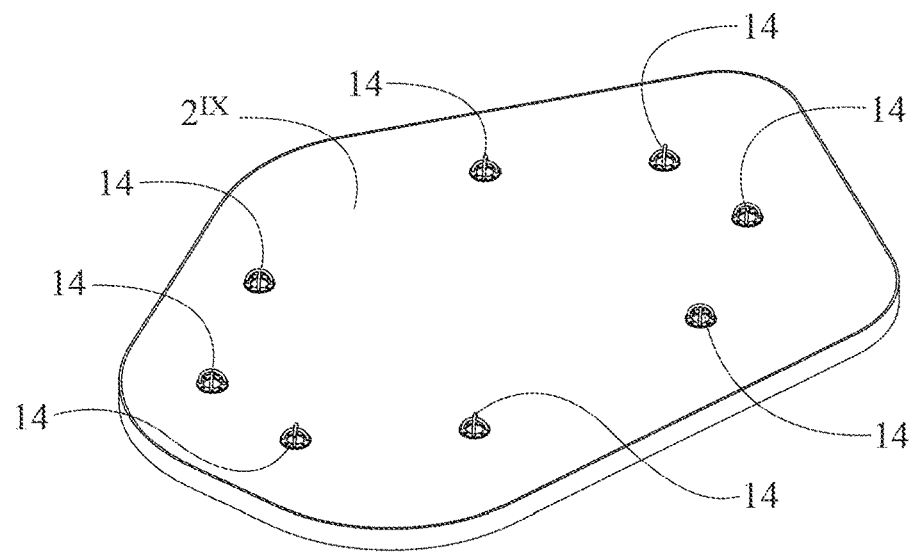
FIG. 28 shows a detailed perspective view of the ninth island $2^{IX}$ of the present modular fitness area 1. More in detail, the figure in question shows that said ninth island $2^{IX}$ has a plurality of coupling systems 14 shaped as centrally-intersected rigid arches, adapted to allow the connection of common cords, such as elastic cords, for carrying out traction exercises.
Figure 29:
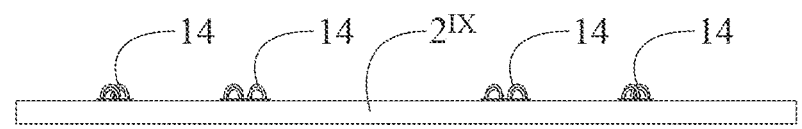
FIG. 29 shows a front view of the ninth island $2^{IX}$.
Figure 30:
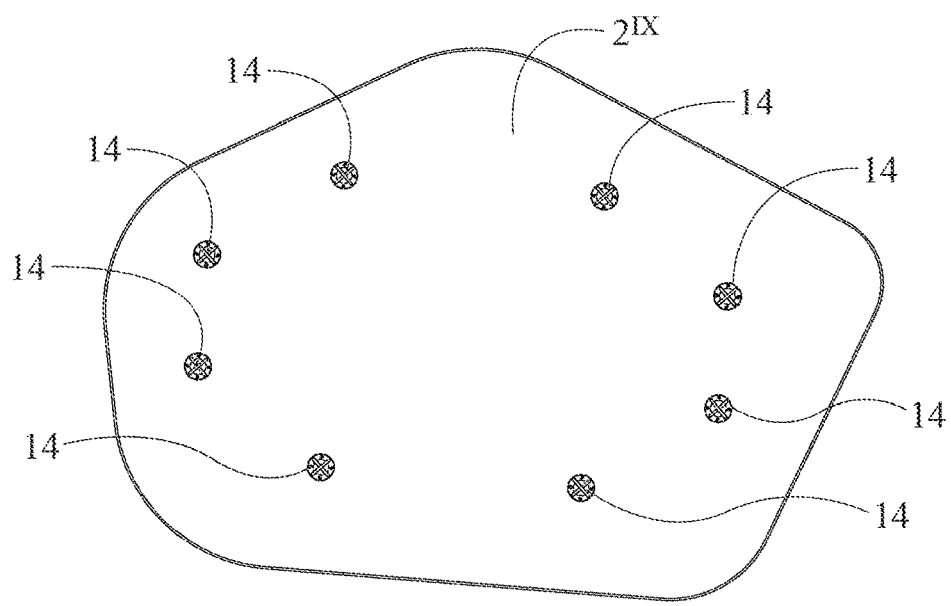
FIG. 30 shows a plant view of the ninth island $2^{IX}$.

In the preferred embodiment thereof, the reversibly installable modular fitness area 1, object of the present industrial invention patent application, comprises a plurality of variously-sized platform-like islands 2, each having a profile defined by any closed curve or polygonal form. More in detail, said modular fitness area 1 comprises a plurality of platform-like islands 2 each in turn comprising one or more systems and/or specific equipment for fitness exercises. Still more specifically, said fitness area 1 comprises: at least one first central island $2^I$ adapted to support a tree-shaped structure 3 in turn comprising a plurality of branch-like extensions 4. From at least one of said branches 4, one or more bars 5 for traction depart, such as the common bars for traction that can be found in the fitness areas. Said modular fitness area 1 also comprises at least one second island $2^{II}$, at least one third island $2^{III}$, at least one fourth island $2^{IV}$, at least one fifth island $2^V$, at least one sixth island $2^{VI}$, at least one seventh island $2^{VII}$, at least one eighth island $2^{XIII}$, and at least one ninth island $2^{IX}$. Of said islands 2, the second island $2^{II}$ is adapted to receive a plurality of handle-shaped gripping systems 6 adapted to allow the user to be able to carry out exercises such as, by way of a non-limiting example, common push-ups. The third island $2^{III}$ comprises one or more bars for agility exercises 7 and one or more elevations 8 for step exercises. The fourth island $2^{IV}$ comprises one or more benches 9, tilted or parallel to the ground, adapted to allow abdominal exercises. The fifth island $2^V$ comprises one or more systems 10, such as oscillating platforms and the like, for carrying out balance exercises. The sixth island $2^{VI}$ comprises at least one structure 11 shaped like a smoothed rock with size such to be able to receive the user even in extended configuration, and it too adapted for carrying out balance exercises. The seventh island $2^{VII}$ comprises a plurality of rubberized mats 12 also having, similar to all the islands 2, a profile defined by any closed curve or polygonal form. Said rubberized mats 12 are adapted to allow ground exercises of various type. The eighth island $2^{VIII}$ comprises at least one, preferably at least two cube-like structures 13 for carrying out fitness exercises. Finally, the ninth island 2 comprises a plurality of coupling systems 14 shaped like centrally-intersected rigid arches, adapted to allow the connection of common elastic cords for carrying out traction exercises.

In other embodiments, the present modular fitness area 1 can comprise one or more additional modules or elements, always aimed to allow the user to carry out different types of fitness exercises. For example, one embodiment of the invention provides that the fitness area 1 comprises a coupling element 15 to be connected directly to the ground, adapted to allow the reversible fixing of a common fitness area rope, e.g. of a jump rope 16.

As mentioned above, the modular fitness area 1, object of the present invention, is substantially characterized in that it is a structure in which several of the components comprised therein cooperate in a synergistic manner or in any case such that the use of one component determines the actuation of another. A structure thus results which is highly efficient and excellent for the objects for which the present invention was attained. As already mentioned, the present modular fitness area 1 comprises a particular energy supply system that makes is self-sufficient from the conventional electrical power supply lines. More in detail, said modular fitness area 1 comprises a power supply system represented by photovoltaic modules shaped as movable leaves 100 which depart from the branches 4 of the central tree 3. More in detail, the movable leaves 100 are variously oriented in space. The orientation can occur manually and/or peripherally and/or remotely in a programmed and automated manner. The movable leaves 100 are connected to the branches 4 by means of common ball joints 300 which allow rotating, and thus spatially orienting, each leaf as desired or, typically, in a manner such that the interaction thereof with the solar radiation is optimal. Each movable leaf 100 is also positioned in proximity to a corresponding grooved housing 200 in which the movable leaves 100 can be retracted when the use thereof is not necessary and the outdoor exposure is not convenient, e.g. if there are thunderstorms, strong wind and/or hail, which could damage their structure. The retraction of the movable leaves 100 within the corresponding grooved housing 200 can occur manually or preferably in an automated manner, upon orientation of the leaves, still in automated manner, in a manner such that said leaves 100 are all in the correct position for the mating entrance thereof within the grooved housing 200 made in the branch 4. The automated orientation of the leaves 100 occurs due to the aforesaid ball joints 300. More in detail, said ball joints 300 are connected to a control system inside the central tree 3 structure which, based on pre-set parameters, with known methods, is able to establish the orientation of each leaf 100 and above all recognize and drive the orientations corresponding with various needs—hence the orientation for the retraction of the movable leaves 100, the orientation thereof based on sunlight exposure hours in order to increase the interaction thereof with the radiation spectrum and for similar applications. Preferably, the fitness area 1 has a common system for detecting atmospheric events such as rain, strong wind, and hail, which is programmed for signaling the attainment of threshold values indicating the extent of the atmospheric event. Once such predetermined threshold values are attained, the movable leaves 100 are automatically retracted.

As repeated several times in the course of the present description, the photovoltaic system for energy supply, with which the modular fitness area 1 is provided, allows power supplying useful systems such as: displays which, supported by common and adapted supports, are preferably placed at each island 2. Such displays are adapted to show the user the video of the correct execution of an exercise. Alternatively, the present fitness area 1 can comprise a single display, the main screen thereof showing icons indicating the various islands 2 which, if selected, show the user the video of interest relative for carrying out a specific fitness exercise. Other systems that can be power supplied with the movable leaves 100 are the following: a system of nozzles 400 variously arranged on the trunk of the central tree and/or on suitable columns close to each island 2, adapted to delivery water in nebulized form in a manner such that the user can be cooled if this is necessary. Typically, the operation of such nozzles 400 is activated at pre-established time intervals during the warmest periods of the year. The system of movable leaves 100 is also capable of activating the automatic sanitization/cleaning of said fitness area 1. This service if offered by suitably-oriented further sanitizing nozzles from which jets of nebulized sanitizing liquid—typically mixtures of water and surfactants—and jets of washing nebulized water flow out in an alternated manner and at pre-established times.

The system of movable leaves 100 is also capable of power supplying the operation of a video-surveillance service represented by common cameras suitably installed on the branches 4 of the central tree 3.

It should also be indicated that the modular fitness area 1 substantially appears as a compact structure, hence occupying a relative small public or private space which allows providing the user with many different types of equipment and systems for physical training, overall making it as efficient as the classic indoor fitness areas/gyms. This functional aspect of the invention derives from some of its particular structural characteristics such as: the characteristic branching tree profile of the central tree 3 having the plurality of branch-like extensions 4, and the profile definable by any closed curve or polygonal form of the islands 2 which allows the same to be arranged in a manner such to occupy a limited space for the user to carry out all the aforesaid fitness exercises. In addition, the same particular profile, both of the central tree 3 and of the islands 2, overall makes the present fitness area 1 a structure that harmonizes with the surrounding environment, typically parks, gardens and the like, thus preventing its installation from altering the natural characteristics of the setting. The fitness area 1 also represents a structure provided with particular aesthetic beauty.

It should also be indicated that the same central tree 3 is not a monolithic structure but rather is a modular structure. Its branches 4 are also extensions represented by ramifications which can have profile defined by curves or polygonal forms that are closed or by open curves and/or polygonal chains. Said branches 4 can be reversibly assembled to the body of the central tree 3, hence being substitutable if damaged and in any case facilitating the assembly, disassembly and/or transfer of the fitness area in its entirety if said operations are necessary. A particular embodiment according to the present invention provides that the fitness area 1 comprises a central tree 3 comprising common radio wave reception/emission systems in a manner so as to allow the user to carry out fitness activities while listening to music or to the news, thus avoiding the use of electronic devices such as mp3 players, smartphones, tablets and similar devices which even if miniaturizable often represent obstacle elements, and also preventing the user from being isolated from the surrounding environment, a condition that quite often occurs when one listens to music outdoors with the aforesaid devices. Other embodiments provide that the fitness area 1 comprise a central tree 3 provided with systems for Wi-Fi connection. All the electronic components, provided for these particular embodiments, including the electrical power supply systems, can be contained within the central tree 3, which is provided with accessible doors in case maintenance operations are requested.

A particular embodiment of the modular fitness area according to the present invention provides that, in said fitness area, a plurality of islands shaped like technical floors are comprised, such floors also adapted for carrying out fitness exercises on the ground and also optionally provided with specific equipment for carrying out such exercises. Said technical floors can be identified with specific nomenclature and are also associated with corresponding demonstration videos.

As repeated several times in the course of the present description, the modular fitness area 1 is to be installed preferably in outdoor public places such as villas, gardens, parks and the like, and at any rate it is also adapted for its installation in closed and/or private places.

Typical installation sites are hotels, resorts, sports centers and generally any public and/or private space, outside or in enclosed settings, in which such installation is of interest for the user.

The invention claimed is:

1. Reversibly installable modular fitness area (1) comprising a plurality of platform-like islands (2) adapted to support a plurality of systems and equipment in order to allow the user to carry out fitness exercises, said modular fitness area (1) comprising at least one first central island ($2I$); at least one second island ($2^{II}$); at least one third island ($2^{III}$); at least one fourth island ($2^{IV}$); at least one fifth island ($2^{V}$); at least one sixth island ($2^{VI}$); at least one seventh island ($2^{VII}$); at least one eighth island ($2^{VIII}$); at least one ninth island ($2^{IX}$); said islands (2) having profile definable by any closed curve or polygonal form; said first island ($2^{I}$) comprising a structure shaped like a central tree (3) in turn comprising a plurality of branch-like extensions (4) from which one or more bars (5) depart; said second island ($2^{II}$) supporting a plurality of handle-shaped gripping systems (6); said third island ($2^{III}$) comprising at least one bar (7) for carrying out agility exercises; said fourth island ($2^{IV}$) comprising at least one bench (9), tilted or parallel with respect to the ground, like a bench adapted to allow abdominal exercises; said fifth island ($2^{V}$) comprising at least one system (10), for carrying out balance exercises; said sixth island ($2^{VI}$) comprising at least one structure (11) shaped like a smoothed rock with size such to be able to receive the user even in extended configuration, it too adapted for carrying out balance exercises; said seventh island ($2^{VII}$) comprising a plurality of rubberized mats (12), having profile defined by any closed curve or polygonal form, in order to allow carrying out fitness exercises of various type; said eighth island ($2^{VIII}$) comprising at least one cube-like structure (13) for carrying out fitness exercises; and said ninth island ($2^{IX}$) comprising a plurality of coupling systems (14) shaped like centrally-intersected rigid arches, adapted to allow the connection of common elastic cords for carrying out traction exercises, said modular fitness area (1) comprising an energy supply system adapted to power supply further components comprised in said fitness area (1), said energy supply system being represented by a plurality of photovoltaic modules shaped as movable leaves (100) connected to the branches (4) due to common ball joints (300) which allow varying the spatial orientation of said movable leaves (100), said orientation of the movable leaves (100) occurring manually or in an automated manner, said ball joints (300) being connectable to an automated control system inside said central tree (3), said movable leaves (100) also being situated with each at a corresponding grooved housing (200) that can be found on the branches (4), each branch adapted to receive the corresponding movable leaf (100) in retracted configuration, said movable leaves (100) able to be spatially configured within the branches (4) or outside said branches (4), said modular fitness area (1) further comprising a common system for detecting predefined threshold values, indicating the extent of atmospheric events, said detection system being adapted to signal the command of the retraction of the movable leaves (100) within the corresponding grooved housings (200).

2. Modular fitness area (1) according to claim 1, further comprising a system of nozzles (400) variously arranged on the trunk of the central tree (3) and/or on suitable columns close to each island (2), said nozzles (400) being adapted to delivery water in nebulized form in a manner such that the user can be cooled if this is necessary, said delivery occurring at pre-established time intervals.

3. Modular fitness area (1) according to claim 1, wherein the system of movable leaves (100) is also capable of activating the automatic sanitization/cleaning of said fitness area (1), said automatic sanitization/cleaning occurring due to a further system of suitably-oriented sanitizing nozzles adapted to deliver, in alternating manner and at pre-established times, the sanitizing liquid and the washing water.

4. Modular fitness area (1) according to claim 1, further comprising a video-surveillance system represented by the operation of common cameras suitably installed on the branches (4) of the central tree (3), said operation being power suppliable with the system of photovoltaic modules shaped as movable leaves (100) comprised in said modular fitness area (1).

5. Modular fitness area (1) according to claim 1, further comprising islands shaped like technical floors also adapted for carrying fitness exercises on the ground, said technical floors being identifiable with specific nomenclature and being associated with corresponding demonstration videos.

6. Reversibly installable modular fitness area (1) according to claim 1, further comprising at least one coupling element (15) to be reversibly connected to the ground for the reversible coupling of a common jump rope (16).

7. Modular fitness area (1) according to claim 1, wherein the central tree-shaped structure (3) internally comprises common radio wave reception/emission systems in order to allow users to listen to music and/or news.

8. Reversibly installable modular fitness area (1) according to claim 1, further comprising systems for the Wi-Fi connection.

9. Modular fitness area (1) according to claim 1, wherein some of the electronic components and relative power supply systems can be contained within the tree-like structure (3), the latter being provided with accessible doors for maintenance purposes.

10. A method carrying out fitness activities in public and/or private spaces, outside or in enclosed settings, comprising providing the modular fitness area of claim 1, and utilizing the modular fitness area to perform the fitness activities.

11. Modular fitness area (1) according to claim 2, wherein the system of movable leaves (100) is also capable of activating the automatic sanitization/cleaning of said fitness area (1), said automatic sanitization/cleaning occurring due to a further system of suitably-oriented sanitizing nozzles adapted to deliver, in alternating manner and at pre-established times, the sanitizing liquid and the washing water.

12. Modular fitness area (1) according to claim 2 further comprising a video-surveillance system represented by the operation of common cameras suitably installed on the branches (4) of the central tree (3), said operation being power suppliable with the system of photovoltaic modules shaped as movable leaves (100) comprised in said modular fitness area (1).

13. Modular fitness area (1) according to claim 3 further comprising a video-surveillance system represented by the operation of common cameras suitably installed on the branches (4) of the central tree (3), said operation being power suppliable with the system of photovoltaic modules shaped as movable leaves (100) comprised in said modular fitness area (1).

14. The modular fitness area of claim 5, wherein the islands comprise specific equipment for carrying out the exercises.

15. Modular fitness area (1) according to claim 2, further comprising islands shaped like technical floors also adapted for carrying fitness exercises on the ground, said technical floors being identifiable with specific nomenclature and being associated with corresponding demonstration videos.

16. Modular fitness area (1) according to claim 3, further comprising islands shaped like technical floors also adapted for carrying fitness exercises on the ground, said technical floors being identifiable with specific nomenclature and being associated with corresponding demonstration videos.

17. Modular fitness area (1) according to claim 4, further comprising islands shaped like technical floors also adapted for carrying fitness exercises on the ground, said technical floors being identifiable with specific nomenclature and being associated with corresponding demonstration videos.

18. Reversibly installable modular fitness area (1) according to claim 2, further comprising at least one coupling element (15) to be reversibly connected to the ground for the reversible coupling of a common jump rope (16).

19. Reversibly installable modular fitness area (1) according to claim 3, further comprising at least one coupling element (15) to be reversibly connected to the ground for the reversible coupling of a common jump rope (16).

20. Reversibly installable modular fitness area (1) according to claim 4, further comprising at least one coupling element (15) to be reversibly connected to the ground for the reversible coupling of a common jump rope (16).

\* \* \* \* \*